(12) United States Patent
Chen et al.

(10) Patent No.: US 7,023,520 B2
(45) Date of Patent: Apr. 4, 2006

(54) METHOD AND SYSTEM FOR FABRICATING LIQUID CRYSTAL FILM AND METHOD FOR FABRICATING BRIGHTENING FILM

(75) Inventors: Chun-Fa Chen, Taipei Hsien (TW); Kun-Mao Yu, Taipei Hsien (TW); Charles Chang, Taipei Hsien (TW)

(73) Assignee: Charmica Photoelectronic Co., Ltd., (TW)

( * ) Notice: Subject to any disclaimer, the term of this patent is extended or adjusted under 35 U.S.C. 154(b) by 78 days.

(21) Appl. No.: 10/871,229

(22) Filed: Jun. 18, 2004

(65) Prior Publication Data
US 2005/0280767 A1    Dec. 22, 2005

(51) Int. Cl.
  G02F 1/13      (2006.01)
  G02F 1/1337    (2006.01)
  C09K 19/02     (2006.01)

(52) U.S. Cl. .................. 349/187; 349/123; 349/185

(58) Field of Classification Search ............... 349/123, 349/175, 185, 187
See application file for complete search history.

(56) References Cited

U.S. PATENT DOCUMENTS

| | | | | |
|---|---|---|---|---|
| 5,570,216 A | * | 10/1996 | Lu et al. | 349/175 |
| 5,676,878 A | * | 10/1997 | Lacey et al. | 252/299.1 |
| 6,025,900 A | * | 2/2000 | Yoon et al. | 349/124 |
| 6,721,030 B1 | * | 4/2004 | Hsieh et al. | 349/191 |
| 6,891,578 B1 | * | 5/2005 | Yonehara et al. | 349/43 |

* cited by examiner

*Primary Examiner*—Tarifur R. Chowdhury
(74) *Attorney, Agent, or Firm*—Peter F. Corless; Steven M. Jensen; Edwards Angell Palmer & Dodge

(57) ABSTRACT

A method and a system for fabricating a liquid crystal film are proposed. First of all, mechanical rubbing is performed on a surface of a plastic substrate. The surface of the substrate is applied with dispersed liquid crystal material over the substrate. At least one cycle annealing treatment is performed to orientate liquid crystal molecules in a fixed direction, so that a liquid crystal solid film is formed by curing the liquid crystal molecules. In addition, a method for fabricating a brightening film using the liquid crystal solid film is also proposed. The method is applicable to a continuous process for forming a cholesteric liquid crystal film on the plastic substrate, and fabricating a reflective cholesteric liquid crystal brightening film using the cholesteric liquid crystal film, so that light transmittivity and intensity are effectively increased under the same backlight source.

25 Claims, 1 Drawing Sheet

METHOD AND SYSTEM FOR FABRICATING LIQUID CRYSTAL FILM AND METHOD FOR FABRICATING BRIGHTENING FILM

BACKGROUND OF THE INVENTION

1. Field of the Invention

The invention relates to a method and system for fabricating a liquid crystal film in a brightening film of a liquid crystal display, and a method for fabricating the brightening film using the liquid crystal film.

2. Description of the Related Art

With a growing popularity for television, personal computer (PC) and handheld product, Liquid crystal display (LCD) has been developed and widely applied in flat televisions, notebook computers, monitors, cell phones, personal digital assistants, and information home appliances. In the development of LCD, products with high brightness and low power consumption still remain the most important trends in the future. However, a color filter, a polaroid glass, and films having high absorption for light are adopted in a thin film transistor liquid crystal display (TFT LCD) to satisfy the full color requirement. The Polaroid glass reduces the light intensity by about 50%, and the color filter further reduces the light intensity by about 66%. Therefore, the manufacturer of the related field has been working on how to achieve higher light penetration power by effectively using the same backlight source.

Currently, it is achieved by adopting multiple-film optical interference theory, where two transparent polymeric materials with different refractive index are laminated and extended in one single direction such that the refractive index of the laminated materials are similar to each other, while in the direction orthogonal to the extension direction, the inherent refractive index of these two materials are maintained. When the laminate is in use, a polar ray O vertical to an optical axle resonance direction of the laminate is allowed to pass through the laminate, while a polar ray E parallel to the optical axle resonance direction is reflected. The reflected E ray is further reflected by a reflecting sheet in a backlight module, and the E ray is transformed into the O ray, so that the transformed O ray can pass through the film to achieve recycling of the light source.

Furthermore, a cholesteric liquid crystal reflective brightening film provides an alternative to increase brightness of LCD based on a theory that the cholesteric liquid crystal has a helix structure that results light reflection at a specific wavelength $\lambda_0$. And the reflective wavelength $\lambda_0$, the pitch P, and the liquid crystal average refractive index na can be related by Maxwell theory as below:

$$\lambda_0 = n_a \times P$$

So, the reflective wavelengths is:

$$\Delta\lambda = \Delta n_d / n_a \times P$$

Theoretically, for a 100% non-polar incident light incident to a cholesteric liquid crystal having right-handed helix structure, 50% of right-handed circular polar light reflects and 50% of left-handed circular polar light passes through the crystal. When the light enters a reflective cholesteric liquid crystal brightening film from a backlight module, only the circular polar light that spirals opposite to the helix structure of the liquid crystal can pass through the liquid crystal, while the circular polar light that spirals along the helix structure of the liquid crystal is reflected back to the backlight module. The reflected circular polar light is reflected again by a reflecting sheet of the backlight module and the reflected circular polar light is then transformed to the circular polar light with opposite helix so as to pass through the liquid crystal, achieving recycling of the light source.

However, the circular polar light that passes through the cholesteric liquid crystal cannot be directly used for LCD. A quarter phase delay film is needed to transform the circular polar light into a linear polar light that is used for LCD.

In massive production of the cholesteric liquid crystal brightening film, cholesteric liquid crystal molecules with different pitches are applied in layers over a plastic substrate. The different pitches of layered material allow passage of lights of various wavelengths over the visible light region. When the light source of the backlight module and cholesteric liquid crystal brightening film achieves increase in brightness and illumination efficiency.

In order to achieve theoretical right-handed polar light reflection of 50% and left-handed polar light reflection of 50% after the film is formed, the cholesteric liquid crystal molecules must align with each other on the plastic substrate to form a helix structure, like springs inside the spring bed.

Typically, an orientation film is applied on the substrate, and the orientation layer is mechanically rubbed clockwise with a nap roller in a contact manner, so that the liquid crystal molecules are well orientated in a direction. According to this method, the orientation film is applied beforehand and is cured under high temperature. If the orientation layer were formed on a glass substrate, no deformation occurs during high-temperature curing. However, if the orientation layer were formed on a plastic substrate, then the plastic substrate would deform and melt under high temperature curing.

The glass substrate is mainly adopted in formation of a display panel. Two glass substrates with orientation films are provided. When the liquid crystal material is filled between the substrates, upper and lower orientation boundaries are provided. By means of appropriate annealing, liquid crystal molecules are easily orientated with limitations from the upper and lower orientation boundaries. However, when the plastic substrate in the rolls is coated, only one face is coated without forming the upper and lower orientation boundaries to achieve well orientation. On the other hand, the orientation film cannot be cured on the plastic substrate. Therefore, it is not impossible to perform a mechanical rubbing by the nap to orientate the liquid crystal. Since the orientated liquid crystal structure is essential to the optical properties of cholesteric liquid crystal, orientation methods by electric field, magnetic field, or stress application other than coating of the orientation film may be adapted to achieve orientation of the liquid crystal molecules. However, for the fabrication that involves continuous coating in rolls, these orientation methods certainly pose limitation for the massive production.

Therefore, it is an urgent need for the manufacturer to develop a method and a system for fabricating the orientated liquid crystal molecules in massive manner.

SUMMARY OF THE INVENTION

It is therefore an object of the invention to provide a method for fabricating a liquid crystal film on a plastic substrate, which is applicable to a continuous process.

It is another object of the invention to provide a method for fabricating a cholesteric liquid crystal film on the plastic substrate, wherein cholesteric liquid crystal molecules of the film have a required orientation.

It is one other object of the invention to provide a system for fabricating a liquid crystal film.

It is a further object of the invention to provide a method for fabricating a brightening film using the liquid crystal film.

In order to achieve the above and other objectives, the method involves performing a clockwise mechanically rubbing on a plastic substrate using a nap roller, and providing the plastic substrate with an energy to arrange polymer chains in the clock direction due to chain extension, so as to achieve orientation for liquid crystal. The liquid crystal includes, but is not limited to, smectic liquid crystal, nematic liquid crystal, cholesteric liquid crystal, nematic cholesteric liquid crystal, rod crystal, disk liquid crystal, plug liquid crystal, polymeric liquid crystal and lyotropic liquid crystal. Since the cholesteric liquid crystal is interdependent on temperature, the pitch of the cholesteric liquid crystal shifts toward short wavelength and blue light at the visible light region is reflected when the cholesteric liquid crystal is annealed at high temperature. On the other hand, when the liquid crystal is annealed at low temperature, the pitch of the cholesteric liquid crystal shifts toward long wavelength and a red light at the visible light region is reflected. After several high-low temperature cycle annealing treatments, the cholesteric liquid crystal acquire a light transmittivity reaching a theoretical value with about 50% of light being reflected and 50% of light being transmitted.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
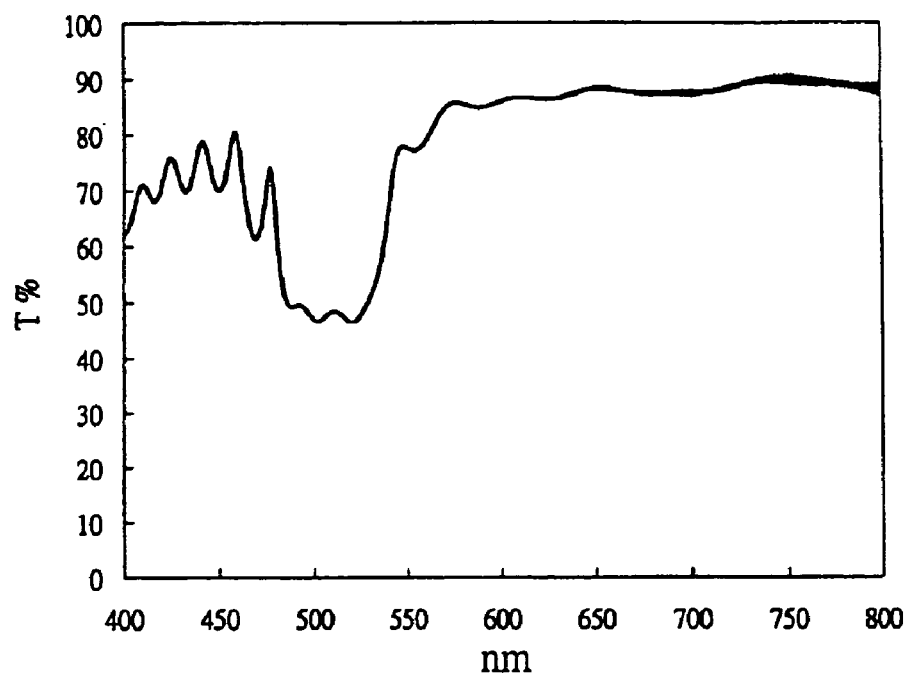
FIG. 1 is a spectrogram of a cholesteric liquid crystal fabricated according to the first embodiment.

Wherever possible in the following description, like reference numerals represent like elements and parts unless otherwise stated.

The method for fabricating the liquid crystal film involves mechanically rubbing on a plastic substrate such that liquid crystal material subsequently applied thereon is orientated in a fixed direction. The type of plastic substrate is not particularly limited, other plastic substrates having optical transmittivity of 85% and above, preferably more than 90%, and most preferably 95% are also applicable in the invention. The example of the plastic substrate includes, but not limited to, polyethylene glycol terephthalate (PET), polycarbonate (PC), polyether sulfone (PES), polymethyl methacrylate (PMMA) and polyethylene-2,6-naphthalate (PEN).

A rubbing unit used to mechanically rub the substrate in the invention includes, but not limited to, nap roller, fiberic textile, or texture with fixed waving structure. The method of performing the mechanically rubbing is not particularly limited, as long as it is a general mechanical rubbing capable of being performed on an orientation film.

In the fabrication method of the invention, the dispersed liquid crystal applied over the plastic substrate may be one made by dissolving liquid crystal material in an appropriate solvent or one made by melting the liquid crystal material before being applied on the plastic substrate. The solvent includes but is not limited to toluene, tetrahydrofuran, cyclohexane, cyclopentanone, and xylene. The dissolving ratio of the liquid crystal material in the solvent is not particularly limited, and the dissolution is preferably at a ratio of the liquid crystal material by the same amount of the solvent. If the solvent is in excess, the solvent may not be completely removed. If the amount of the solvent is insufficient, the liquid crystal may not be dispersed well. Therefore, the ratio at which the liquid crystal is dissolved with the solvent may be adjusted by one skilled in the pertinent art, depending on the types of the liquid crystal and the solvent used.

The dispersed liquid crystal is applied over the plastic substrate by coating, and preferably by slit coating. The slit coating is characterized in that it is performed in a closed system to reduce evaporation of the solvent to result an increase in solid content. Furthermore, the slit coating can be implemented in various manners at high speed and high uniformity. If the dispersed liquid crystal is the one made by dissolving the liquid crystal in the solvent, it is preferable to completely dissolve the liquid crystal material and eliminate bubbles before being applied over the plastic substrate.

The liquid crystal material applied over the plastic substrate is subjected to at least one cycle annealing treatment to orientate the liquid crystal molecules in a fixed direction. The cycle annealing treatment is performed at a first annealing temperature and a second annealing temperature lower than the first annealing temperature by more than 40° C., preferably by more than 50° C., and most preferably by more than 60° C. The first annealing temperature is higher than the second one. However, the first and second annealing temperatures are not particularly limited, as long as the annealing temperatures are not higher than a glass transition temperature for the plastic substrate and the liquid crystal molecules are orientated in the fixed direction. The first and second annealing temperatures are usually in a range of 1° C. to 130° C., and preferably a range of 20° C. to 110° C. In the cycle annealing treatment according to the fabrication method of the invention, the duration for performing the annealing treatment at the first annealing temperature is about 1.5 to 2.5 times of that at the second annealing temperature. The cycle annealing treatment is preferably performed for 5 to 50 times, and more preferably 20–30 times. If the applied liquid crystal film is not subjected to the cycle annealing treatment or is annealed at a fixed temperature, the liquid crystal film that is cured suffers poor transmissivity, causing scattering of incident lights easily. On the other hand, if number of the cycle annealing treatment is too much, the production time is prolonged to reduce the production yield, even though the liquid crystal film with good transmissivity is yielded.

According to the fabrication method of the invention, the evaporable solvent in the liquid crystal film may be removed before the annealing treatment, or removed at a first temperature rise stage in the annealing treatment.

After the annealing treatment, the orientated liquid crystal film is irradiated with radiation to trigger a crosslink reaction that causes curing. The radiation source may be selected from radiation sources having a wavelength of 280–700 nm. And depending on the type of light initiating reagent, radiation source of different wavelengths is selected. The radiation source includes but is not limited to UV light, X ray, electron beam, or laser. The liquid crystal solid film that is completed with the above-described crosslinked curing can be directly used in a downstream fabrication method for fabricating a brightening film or a semi-manufacture rolled up by a reel.

The system of producing a liquid crystal film according to the invention includes a rubbing unit for mechanically rubbing the substrate, an applying unit for applying the dispersed liquid crystal material over the substrate, a cycle annealing unit for performing a cycle annealing treatment, a curing unit for crosslinking the liquid crystal molecules, and a input conveyor unit for inputting the plastic substrate to the system described above, so that the plastic substrate is conveyed to the rubbing unit, the applying unit, the cycle annealing unit and the curing unit. The system further includes an unfolding unit, such as an unfolding machine for unfolding the plastic substrate, and a reeling unit for rolling up the liquid crystal solid film that is completed with the crosslinked curing.

The applying unit may be a coater having a close system to reduce evaporation of the solvent that causes an increase in solid content. The coater may be, but not limited to, a slit coater, a lip coater, and a gravure coater.

The annealing cycle unit includes, but is not limited to, a tunnel oven with cooling sections, an air-convection annealing unit, a roller-contact annealing unit and an irradiation annealing unit.

The radiation source used for the curing unit includes, but is not limited to, UV light, X ray, electron beam and laser.

According to one embodiment, the cholesteric liquid crystal material is dissolved at an appropriate ratio with the solvent into a dispersion state where the cholesteric liquid crystal is completely dissolved and bubbles are eliminated. The dispersed cholesteric liquid crystal is then applied over the plastic substrate that has been mechanically rubbed by a nap roller. After the evaporable solvent is removed from the liquid crystal film applied as described above, the substrate is subjected to the cycle annealing treatment at a first annealing temperature of 110° C. and a second annealing temperature of 20° C. With about 5–30 cycles of the annealing treatment, the liquid crystal is orientated in a fixed direction. The annealed liquid crystal film is irradiated with UV light to crosslink the orientated cholesteric liquid crystal molecules.

The cholesteric liquid crystal has a spiral molecular structure with specific optical properties such as optical rotation, selective scattering, circular polarized dichroism. Due to its special spiral molecular structure, the cholesteric liquid crystal has a negative bi-refractiveness. The cholesteric liquid crystal is solid state at room temperature and soluble in solvent. The solvent used to dissolve the cholesteric liquid crystal includes, but is not limited to, toluene, tetrahydrofuran, cyclohexane, cyclopentanone, and xylene. In general, apart from dissolving the cholesteric liquid crystal in the solvent, the cholesteric liquid crystal can also be melted by heating before being applied over the plastic substrate.

The method for fabricating the brightening film involves unfolding rolls of cholesteric liquid crystal film with the coating. Alternatively, after the above cholesteric liquid crystal film has been manufactured, a highly transparent optical film is applied over the liquid crystal solid film. With a bonding unit, such as a bonder, a quarter phase retardation film is bonded to the liquid crystal film to form the brightening film. The transparent optical film includes but is not limited to those having commercial names of COPONYL N-2233, COPONYL N-2147, COPONYL-N 3816, COPONYL N-4122, COPONYL N-4144, and UV-3620ID70, manufactured by NIPPON GOHSEI Company.

The quarter phase retardation film is not particularly limited, as long as it converts circular polarization acquired by the cholesteric liquid crystal film into linear polarization. The quarter phase retardation film can be, for example, the products with commercial names of RETARDATION FILM (manufactured by TEIJIN, Japan, and sold by commercial names as T-127, T-138, T-278, W-141, W-147, and M-137), ARTON FILM (manufactured by JSP Company, Japan), and COC (manufactured by Mitsui Chemicals, Japan).

The First Embodiment

At room temperature, 100 g of nematic cholesteric liquid crystal having a symmetric center is dissolved in 100 g of tetrahydrofuran, and 5 g of optical initiator (made by Ciba Company, with commercial name: IRGACURE 907) is further added and dissolved to form a cholesteric liquid crystal solution. With a quantitative pump, the cholesteric liquid crystal solution is quantitatively transported to a slit coater having a coating head to apply the cholesteric liquid crystal solution over a PET substrate that is subjected to rubbing by the nap roller and having optical transmissivity of more than 90%.

The curing step is performed at 100° C. to remove the solvent so as to form the cholesteric liquid crystal film. Next, the cycle annealing treatment is performed at 20° C. and 110° C. for 10 cycles lasting 10 minutes to orientate the cholesteric liquid crystal molecules in a fixed direction. The orientated cholesteric liquid crystal molecules are irradiated using UV light of 365 nm to trigger the crosslinked curing reaction so as to obtain a cholesteric liquid crystal solid film sample 1. The transmissivity of the sample 1 is measured by a spectrometer, and the results are shown in FIG. 1.

COMPARATIVE EXAMPLE 1

The comparative example 1 is carried out by the same method in the first embodiment, except that the annealing is performed at a fixed temperature of 110° C. for 10 minutes to obtain a cholesteric liquid crystal solid film sample 2. The transmissivity of the sample 2 is measured by the spectrometer, and the results are shown in FIG. 2.

Figure 2:
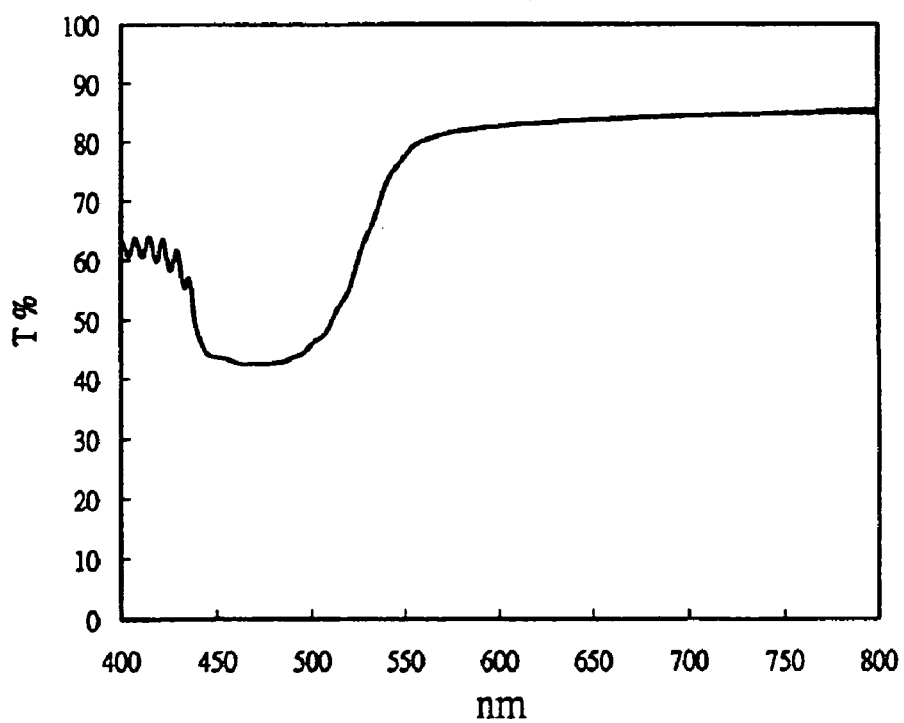
FIG. 2 is a spectrogram of a cholesteric liquid crystal fabricated according to comparative example 1.

As is understood from the results shown in FIG. 1 and FIG. 2, the cholesteric liquid crystal film that is formed as a result of fixed temperature annealing and without being subjected to high-low temperature cycle annealing process has a transmission spectrum that doe not show an cylindrical-like distribution in a region of selected wavelength, but a rather smooth bell-shaped distribution as illustrated in FIG. 2. On the other hand, mist can be found by visual inspection on the film surface to result in poor transmissivity. In contrast to this, the cholesteric liquid crystal subjected to the high-low temperature annealing cycles exhibits a cylindrical-like distribution for transmittivity spectrum in the region of selected wavelength, and transmittivity reaching to almost a theoretical transmissivity value. That is, 50% of light is reflected and remaining 50% of light is transmitted, as shown in FIG. 1. Furthermore, the cholesteric liquid crystal subjected to the high-low temperature annealing cycles has a surface that is similar to a mirror surface and having high transmissivity.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A method for fabricating a liquid crystal film, comprising steps of:
   performing a mechanical rubbing on a surface of a plastic substrate;
   applying a dispersed liquid crystal material over the surface of the plastic substrate;
   performing at least one cycle annealing treatment for orientating liquid crystal molecules, wherein the cycle annealing treatment is performed at a first annealing temperature and a second annealing temperature lower than the first annealing temperature by more than 40° C., and the first annealing temperature is lower than a glass transition temperature for the plastic substrate; and
   curing the orientated liquid crystal molecules for forming a liquid crystal solid film.

2. The method of claim 1, wherein the mechanical rubbing is performed by using a nap roller.

3. The method of claim 1, wherein the liquid crystal material is one selected from smectic liquid crystal, nematic liquid crystal, cholesteric liquid crystal, nematic cholesteric liquid crystal, rod crystal, disk liquid crystal, plug liquid crystal, polymeric liquid crystal and lyotropic liquid crystal.

4. The method of claim 3, wherein the liquid crystal material is the cholesteric liquid crystal.

5. The method of claim 1, wherein the dispersed liquid crystal material is one that is made by dissolving liquid crystal material in a solvent.

6. The method of claim 5, wherein the solvent is selected from a group consisting of toluene, tetrahydrofuran, cyclohexane, cyclopentanone, and xylene.

7. The method of claim 5, wherein the dispersed liquid crystal material is applied over the surface of the plastic substrate after bubbles are removed, and the solvent is removed after the material is applied.

8. The method of claim 1, wherein the dispersed liquid crystal material is one that is made by melting liquid crystal material by heat.

9. The method of claim 1, wherein the plastic substrate is selected from polyethylene glycol terephthalate (PET), polycarbonate (PC), polyether sulfone (PES), polymethyl methacrylate (PMMA) and polyethylene-2,6-naphthalate (PEN).

10. The method of claim 1, wherein the dispersed liquid crystal is applied by a coating method over the surface of the plastic substrate.

11. The method of claim 10, wherein the coating method is a slit coating method.

12. The method of claim 1, wherein the curing step is performed by irradiating with radiation.

13. The method of claim 12, wherein the radiation is selected from a group consisting of UV light, X ray, electron beam, and laser.

14. A method for fabricating a brightening film, comprising steps of:
   applying a transparent optical film on the liquid crystal solid film fabricated according to claim 1; and
   bonding a quarter phase delay film to the liquid crystal solid film to form the brightening film.

15. A system for fabricating a liquid crystal film, comprising:
   a rubbing unit, for mechanically rubbing a surface of a plastic substrate;
   an applying unit, for applying a dispersed liquid crystal material over the surface of the plastic substrate;
   a cycle annealing unit, for performing at least one cycle annealing to orientate liquid crystal molecules, wherein the cycle annealing treatment is performed at a first annealing temperature and a second annealing temperature lower than the first annealing temperature by more than 40° C., and the first annealing temperature is lower than a glass transition temperature for the plastic substrate;
   a curing unit, for curing the orientated liquid crystal molecules to form a liquid crystal solid film; and
   an input conveying unit, for inputting the plastic substrate and conveying the plastic substrate in sequence to the rubbing unit, the applying unit, the cycle annealing unit and the curing unit.

16. The system of claim 15, wherein the rubbing unit is nap roller.

17. The system of claim 15, wherein the applying unit is a coater.

18. The system of claim 17, wherein the coater is a slit coater.

19. The system of claim 15, wherein the annealing unit is a tunneling oven with cooling sections.

20. The system of claim 15, wherein the curing unit is a source of radiation.

21. The system of claim 20, wherein the radiation is selected from a group consisting of UV light, X ray, electron beam, and laser.

22. The system of claim 15, further comprising an unfolding unit used to unfold the plastic substrate.

23. The system of claim 22, wherein the unfolding unit is an unfolding machine.

24. The system of claim 15, further comprising a rolling unit used to fold the liquid crystal solid film.

25. The system of claim 24, wherein the rolling device is a reel.

* * * * *